United States Patent [19]

Bai et al.

[11] Patent Number: 5,416,053

[45] Date of Patent: May 16, 1995

[54] HOMOGENOUS POLYETHYLENES AND ETHYLENE/PROPYLENE COPOLYMERS RUBBERS

[75] Inventors: Xinlai Bai, Piscataway; Kevin J. Cann, Rocky Hill, both of N.J.

[73] Assignee: Union Carbide Chemicals & Plastics Technology Corporation, Danbury, Conn.

[21] Appl. No.: 83,664

[22] Filed: Jun. 28, 1993

[51] Int. Cl.⁶ .............................................. B01J 31/00
[52] U.S. Cl. .................................. 502/128; 502/103; 502/118; 526/116; 526/119; 526/129; 526/141; 526/142
[58] Field of Search ........................ 502/103, 118, 128

[56] References Cited

U.S. PATENT DOCUMENTS

| | | | |
|---|---|---|---|
| 4,017,669 | 4/1977 | Collette et al. | 526/169 |
| 4,508,842 | 4/1985 | Beran et al. | 502/112 |
| 4,593,010 | 6/1986 | Malpass | 502/128 |
| 4,755,495 | 7/1988 | Cann et al. | 502/119 |
| 4,892,853 | 1/1990 | Cann et al. | 502/112 |
| 4,918,038 | 4/1990 | Samuels et al. | 502/119 |
| 5,006,618 | 4/1991 | Miro | 502/113 |
| 5,082,908 | 1/1992 | Imai et al. | 526/143 |

FOREIGN PATENT DOCUMENTS

| | | |
|---|---|---|
| 0413530 | 2/1991 | European Pat. Off. . |
| 417710 | 3/1991 | European Pat. Off. . |
| 1519473 | 7/1978 | United Kingdom . |
| 2105355 | 3/1983 | United Kingdom . |

*Primary Examiner*—Asok Pal
*Assistant Examiner*—E. D. Irzinski
*Attorney, Agent, or Firm*—Saul R. Bresch

[57] ABSTRACT

A process for the production of polyethylenes or EPRs comprising contacting a mixture comprising ethylene, one or more alpha-olefins, and, optionally, a diene, under polymerization conditions, with a catalyst system comprising:

(A) a catalyst precursor comprising:
 (i) a vanadium compound, which is the reaction product of
  (a) $VX_3$ wherein each X is independently chlorine, bromine, or iodine; and
  (b) an electron donor, which is a liquid, organic Lewis base in which $VX_3$ is soluble;
 (ii) a modifier having the formula $BX_3$ or $AlR_{(3-a)}X_a$ wherein each R is independently alkyl having 1 to 14 carbon atoms; each X is as defined above; and a is 0, 1, or 2; and
 (iii) a support for said vanadium compound and modifier,
  said catalyst precursor being in an independent or prepolymerized state,
(B) a cocatalyst consisting of a compound having the formula $AlR_{(3-a)}X_a$ wherein R and X are as defined above and a is 1 or 2; and
(C) a promoter consisting of a saturated or an unsaturated aliphatic halocarbon having at least 3 carbon atoms and at least 6 halogen atoms, or a haloalkyl substituted aromatic hydrocarbon wherein the haloalkyl substituent has at least 3 halogen atoms.

4 Claims, No Drawings

HOMOGENOUS POLYETHYLENES AND ETHYLENE/PROPYLENE COPOLYMERS RUBBERS

TECHNICAL FIELD

This invention relates to (i) homogeneous polyethylenes having a narrow molecular weight distribution and a narrow comonomer distribution and (ii) ethylene/propylene copolymer rubbers (EPRs), which include ethylene/propylene copolymers (EPMs) and ethylene/propylene/ethylidene norbornene terpolymers (EPDMs), generally having a crystalline content of less than about 15 percent by weight, and a process for their production.

BACKGROUND INFORMATION

Homogeneous polyethylenes and EPRs are elastomeric copolymers and terpolymers used in such applications as hose and tubing, wire and cable, gaskets, and single ply roofing. They are usually formulated with fillers, oils, processing aids, and stabilizing agents.

The EPRs are presently manufactured commercially in solution and slurry processes with soluble vanadium catalysts. These processes are very expensive to run, requiring solvent removal and steam stripping steps. In addition, these solution catalysts do not provide satisfactory particle morphology in a fluidized bed. Improvement in these processes would be desirable and, particularly, the development of a gas phase process to produce these same products would be more economically attractive because little post-reaction cost will be incurred, and particle morphology would, expectedly, be improved.

One of the catalyst systems selected to produce these polymers in the gas phase is described in U.S. Pat. No. 4,508,842. Typically, the catalyst system is comprised of a catalyst precursor, which is the reaction product of vanadium trichloride and an electron donor, the precursor being reacted with an aluminum containing modifier, and impregnated into a silica support; a promoter such as chloroform; and a triisobutylaluminum cocatalyst. This catalyst system produces a compositionally heterogeneous resin. It does achieve good particle morphology, but the non-uniform composition and broad molecular weight distribution results in polyethylene products with poor transparency and poor heat-sealing properties. In addition, EPRs made with this catalyst exhibit poor cure and contain much high temperature crystallinity. This is believed to be the result of poorly distributed propylene, and, in the case of the EPDMs, poorly distributed diene.

DISCLOSURE OF THE INVENTION

An object of this invention, therefore, is to provide a process for the production of homogeneous polyethylenes and EPRs, i.e., those having a crystallinity of less than about 15 percent by weight, which are relatively free of the deficiencies mentioned above. Other objects and advantages will become apparent hereinafter.

According to the present invention, the above object is met by a process for the production of polyethylenes or EPRs comprising contacting a mixture comprising ethylene, one or more alpha-olefins, and, optionally, a diene, under polymerization conditions, with a catalyst system comprising:

(A) a catalyst precursor comprising:

(i) a vanadium compound, which is the reaction product of (a) $VX_3$ wherein each X is independently chlorine, bromine, or iodine; and (b) an electron donor, which is a liquid, organic Lewis base in which $VX_3$ is soluble;

(ii) a modifier having the formula $BX_3$ or $AlR_{(3-a)}X_a$ wherein each R is independently alkyl having 1 to 14 carbon atoms; each X is as defined above; and a is 0, 1, or 2; and (iii) a support for said vanadium compound and modifier, said catalyst precursor being in an independent or prepolymerized state, (B) a cocatalyst consisting of a compound having the formula $AlR_{(3-a)}X_a$ wherein R and X are as defined above and a is 1 or 2; and (C) a promoter consisting of a saturated or an unsaturated aliphatic halocarbon having at least 3 carbon atoms and at least 6 halogen atoms, or a haloalkyl substituted aromatic hydrocarbon wherein the haloalkyl substituent has at least 3 halogen atoms.

DESCRIPTION OF THE PREFERRED EMBODIMENT(S)

The vanadium based catalyst precursor in the un-prepolymerized state and a process for preparing same are described in U.S. Pat. No. 4,508,842. The preferred vanadium trihalide ($VX_3$) is vanadium trichloride. The electron donor is a liquid, organic Lewis base in which the vanadium trihalide is soluble. The electron donor is, generally, liquid at temperatures in the range of about 0° C. to about 200° C.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound.

The modifier has the formula $BX_3$ or $AlR_{(3-a)}X_a$ wherein each R is independently alkyl having 1 to 14 carbon atoms; each X is independently chlorine, bromine, or iodine; and a is 0, 1, or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to vanadium can be in the range of about 1:1 to about 10:1 and is preferably in the range of about 2:1 to about 5:1.

The promoter can be a saturated aliphatic halocarbon having the formula $C_3(X)_a(F)_b(H)_c$ wherein each X is independently chlorine, bromine, or iodine; a is an integer from 6 to 8; b and c are integers from 0 to 2; and a+b+c equal 8. Examples of these halocarbon promoters are hexachloropropane, heptachloropropane, and octachloropropane. These saturated halocarbon promoters are mentioned in U.S. Pat. No. 4,892,853. The promoter can also be an unsaturated aliphatic halocarbon such as perchloropropene or any unsaturated halocarbon having a $CX_3$ group attached to a C=C group wherein each X is independently chlorine, bromine, or iodine. Finally, the promoter can be a haloalkyl substituted aromatic hydrocarbon wherein the haloalkyl substituent has at least 3 halogen atoms such as trichlorotoluene and trichloroxylene. Again, the halogen can be chlorine, bromine, or iodine. The number of carbon atoms in the halocarbon or the haloalkyl substituent can be 1 to 14, and the number of benzene rings in the halocarbon or the aromatic hydrocarbon can be 1 to 3, but is preferably one. About 0.01 to about 10 moles, and preferably about 0.2 to about 1 mole, of promoter can be used per mole of cocatalyst.

The cocatalyst can be a compound having the formula $AlR_{(3-a)}X_a$ wherein each R is independently alkyl having 1 to 14 carbon atoms; each X is independently chlorine, bromine, or iodine; and a is 1or 2. The cocatalyst can be present in the catalyst system in an amount of about 10 to about 500 moles of cocatalyst per gram atom of vanadium, and is preferably introduced in an amount of about 30 to about 150 moles of cocatalyst per gram atom of vanadium.

Examples of halogen containing modifiers and cocatalysts are di-n-butylaluminum chloride; diethylaluminum chloride; diisobutylaluminum chloride; ethylaluminum sesquichloride; methylaluminum sesquichloride; isobutylaluminum sesquichloride; dimethylaluminum chloride; di-n-propylaluminum chloride; methylaluminum dichloride; and isobutylaluminum dichloride.

Examples of trialkylaluminum modifiers are triisobutylaluminum, trihexylaluminum, di-isobutylhexylaluminum, isobutyldihexylaluminum, trimethylaluminum, triethylaluminum, tripropylaluminum, triisopropylaluminum, tri-n-butylaluminum, trioctylaluminum, tridecylaluminum, and tridodecylaluminum.

The support can be inorganic or organic such as silica, alumina, or polymeric; silica is preferred.. Examples of polymeric supports are porous crosslinked polystyrene and polypropylene. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support is accomplished by mixing the precursor and silica gel in the electron donor solvent or other solvent followed by solvent removal under reduced pressure.

The modifier is usually dissolved in an organic solvent such as isopentane and impregnated into the support following impregnation of the precursor, after which the supported catalyst precursor is dried. The promoter can also be impregnated into the support in similar fashion, if desired. The cocatalyst and promoter are preferably added separately neat or as solutions in an inert solvent, such as isopentane, to the polymerization reactor at the same time as the flow of ethylene is initiated.

The catalyst precursor described above can be used in prepolymer form. A technique for prepolymerization can be found in U.S. Pat. No. 4,970,279. Typically, the prepolymerization is carried out in the liquid phase in a similar manner to a diluent slurry polymerization. The catalyst system used in the prepolymerization is the same one that will be used in the fluidized bed polymerization. The difference lies in the monomers used and weight ratio of monomer(s) to catalyst precursor, which is at least about 10:1, and is typically about 50:1 to about 300:1. It should be pointed out that the numbers vary with the particular catalyst system selected. Examples of suitable prepolymers are homoprepolymers of ethylene, ethylene/propylene coprepolymers, ethylene/1-hexene coprepolymers, ethylene/propylene/1-hexene terprepolymers, and ethylene/propylene/diene terprepolymers. The prepolymer does not have to be the same as the resin product of the main polymerization.

The amount of prepolymer formed, in terms of grams of prepolymer per gram of catalyst precursor, generally depends on the composition of the prepolymer, the composition of the polymer being produced, and the productivity of the catalyst employed. The prepolymer loading is chosen so as to minimize prepolymer residue in the product resin.

A typical prepolymerization can be carried out in a slurry prepolymerizer. The equipment includes a monomer feed system, a reaction vessel, and an inert screener. The reactor is a jacketed pressure vessel with a helical ribbon agitator to give good solids mixing, and with a bottom cone to facilitate solids discharge. Ethylene is fed from cylinders, with the pressure regulated, through 4A or 13X molecular sieves to remove impurities, and then through a flow meter to measure flow rate. Other olefins, if required, are fed from cylinders via a dip tube with nitrogen pressure supplied to the cylinder headspace. They also pass through 4A or 13X molecular sieves and through a flow meter. The monomers can be fed to either the reactor headspace or subsurface, with subsurface preferred as it increases the reaction rate by eliminating one mass transfer step. Temperature is controlled with a closed loop tempered water system. Pressure is controlled with a vent/make-up system.

The finished prepolymerized catalyst is screened to remove skins, agglomerates, and other types of oversize particles that could cause feeding difficulties into the gas phase reactor. The screening is done with a vibratory screener with a 20 mesh screen. The screener is kept under a nitrogen atmosphere to maintain the prepolymerized catalyst activity. Oversize material is collected for disposition. The desired undersize fraction is discharged into a cylinder for storage and shipping.

The typical prepolymerization is a slurry polymerization of ethylene and, optionally, a comonomer under mild conditions. Isopentane, hexane, and heptane can be used as the solvent, with isopentane preferred for its higher volatility. Mild conditions are necessary to minimize catalyst decay during the prepolymerization so that there is sufficient activity for the subsequent gas phase polymerization, which may occur months after the prepolymerization. Such conditions will vary with different catalyst systems, but are typically temperatures of about 25° to about 70° C., monomer partial pressures of about 15 to about 40 psi, and levels of cocatalyst and catalyst promoter of about 1 to about 5 moles per mole of vanadium. The prepolymer loading ranges from about 10 to about 500 grams per gram of supported catalyst precursor, preferably from about 50 to about 300 grams per gram. The comonomer content of the prepolymer ranges from 0 to 15 weight percent. Hydrogen, or other chain transfer agents, can be added at the start of polymerization or throughout the polymerization to control molecular weight. Additional olefins or dienes may also be added. When the polymerization is complete, the agitator is stopped and the solids are allowed to settle so that the excess solvent can be removed by decanting. The remaining solvent is removed by drying, using low temperatures to avoid catalyst decay. The dried prepolymer catalyst is discharged to a storage cylinder through an inert screener, to remove oversize (+20 mesh) material.

The polymerization can be conducted in a solution or in a slurry as described above for the prepolymerization, or in the gas phase, preferably in a fluidized bed. The fluidized bed can be a stirred fluidized bed reactor or a fluidized bed reactor, which is not stirred. In terms of the fluidized bed, a superficial velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The ethylene partial pressure can be in the range of about 25 psi to about 350 psi and is preferably in the range of about 80 psi to about 250 psi. The temperature can be in the range of about 0° C. to about 100° C. The preferred temperature for the production of polyethylenes is in the range of about 65° C. to about 85° C. and the preferred temperature for the production of EPRs is in the range of about 50° C. to about 70° C. The gaseous feed streams of ethylene, alpha-olefin, and hydrogen(or another chain transfer agent) are preferably fed to the reactor recycle line while liquid ethylidene norbornene or another diene, if used, and the cocatalyst solution are preferably fed directly to the fluidized bed reactor to enhance mixing and dispersion. The prepolymer containing the catalyst precursor is transferred into the fluidized bed from the catalyst feeder. The composition of the polymer product can be varied by changing the alpha-olefin/ethylene molar ratio in the gas phase and the diene (if used) concentration in the fluidized bed. The product is intermittently discharged from the reactor as the bed level builds up with polymerization. The production rate is controlled by adjusting the catalyst feed rate.

Two types of polymers are considered here, polyethylenes and EPRs. The polyethylenes are, generally, homopolymers of ethylene and copolymers of ethylene and one or more alpha-olefins having 3 to 12 carbon atoms, and preferably 3 to 8 carbon atoms. Examples of the alpha-olefins are propylene, 1-butene, 1-hexene, 4-methyl-1-pentene, and 1-octene. The EPRs are either copolymers of ethylene and propylene or terpolymers of ethylene, propylene, and a diene such as ethylidene norbornene, 1,4-pentadiene, 1,3-hexadiene, and 1,4-octadiene.

The molar ratio of monomers in the reactor will be different for different catalyst systems, as is well-known to those skilled in the art. The alpha-olefin/ethylene molar ratio is adjusted to control the level of alpha-olefin incorporated into the polymer. The propylene/ethylene ratio can be in the range of about 0.05:1 to about 2.5:1 and is preferably in the range of about 0.25:1 to about 1.5:1. The 1-hexene/ethylene molar ratio can be in the range of about 0.005:1 to about 0.050:1 and is preferably in the range of about 0.008:1 to about 0.012:1. The hydrogen/ethylene molar ratio is adjusted to control average molecular weights of the terpolymer. The level of diene in the bed, if used, is in the range of about 1 to about 15 weight percent based on the weight of the bed, and is preferably in the range of about 2 to about 10 weight percent. Examples of useful dienes, in addition to ethylidene norbornene (ENB), are 1,4-hexadiene and dicyclopentadiene dimer.

Steps can be taken to reduce agglomeration. For example, fluidization aids can be provided as described in U.S. Pat. No. 4,994,534. Also, the product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

Static can also be controlled by using small amounts of an inert conductive particulate material such as carbon black. The amount of inert particulate material is that which is sufficient to control static, i.e., about 0.5 to about 1.5 percent by weight based on the weight of the fluidized bed. Carbon black is the preferred antistatic material. The mean particle size of the inert conductive particulate material is in the range of about 0.01 to about 150 microns, preferably to about 10 microns. The mean particle size can refer to the particle per se or to an aggregate as in the case of carbon black. The carbon black materials employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures. Other antistatic agents are also found to be effective in keeping the static level under control as mentioned, for example, in U.S. Pat. No. 5,194,526.

The residence time of the mixture of comonomers, resin, catalyst, and liquid in the fluidized bed can be in the range of about 1.5 to about 8 hours and is preferably in the range of about 2 to about 4 hours. The final product can contain the following amounts of reacted comonomers: about 35 to about 80 percent by weight ethylene; about 18 to about 50 percent by weight alpha-olefin; and about 0 to about 15 percent by weight diene. The crystallinity, also in weight percent based on the total weight of the resin product, can be in the range of zero (essentially amorphous) to about 15 percent by weight (nearly amorphous). The Mooney viscosity can be in the range of about 10 to about 150 and is preferably about 30 to about 100. The Mooney viscosity is measured by introducing the polymer into a vessel with a large rotor, preheating for one minute at 100° C., and then stirring for four minutes at the same temperature. The viscosity is measured at 100° C. in the usual manner.

The fluidized bed reactor can be the one described in U.S. Pat. No. 4,482,687 or another conventional reactor for the gas phase production of, for example, polyethylene. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas is comprised of ethylene, nitrogen, hydrogen, and propylene, either alone or in combination. The process can be carried out in a batch or continuous mode, the latter being preferred. The essential parts of the first reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the reactor to improve the fill level of the product discharge vessel.

The advantages of the invention are found in the production of homogeneous polyethylene resins having narrow molecular weight distributions, the products of which have exemplary transparency and heat-sealing properties; in the production of EPRs having improved cure performance and improved high temperature crystallinity; and in the provision of a polymerization process, which is equal to or better than commercially available solution processes for the production of EPM and EPDM, and results in good particle morphology.

The patents mentioned in this application are incorporated by reference herein.

The invention is illustrated by the following examples.

EXAMPLES 1 TO 21

In the examples, the reactor used for the preparation of the catalyst precursor and the polymerization is a stirred reactor. The polymerization is carried out in a hexane slurry.

The catalyst system for the polymerization includes a vanadium based catalyst precursor; a cocatalyst; and a promoter. The catalyst precursor is first prepared using conventional procedures such as the procedure described in U.S. Pat. No. 4,508,842, i.e., the reaction product of vanadium trichloride and an electron donor (tetrahydrofuran) are supported on dehydrated silica followed by a modification step to reduce the supported precursor with diethylaluminum chloride (DEAC).

POLYMERIZATION

To a one liter stirred batch reactor is charged, under nitrogen, 500 milliliters of dry hexane. The catalyst precursor is then charged, followed by a one time batch charge of 1-hexene(examples 1 to 19), and hydrogen for molecular weight control. The reactor is pressurized at the desired reaction temperature with ethylene (examples 1 to 19) and ethylene and propylene(examples 20 and 21) to establish a gas composition of particular molar ratio. The molar ratio of propylene to ethylene is 1:1. The ENB is charged next in examples 20 and 21. The promoter is charged and the reactor solution temperature is lowered 5° to 10° C. before the addition of the cocatalyst. The cocatalyst is added and the reactor solution is brought up to the desired temperature. Propylene and ethylene are fed at a 0.35 C3/C2 molar ratio so as to maintain the prescribed reactor pressure. ENB is added in examples 20 and 21 as needed to maintain constant concentration in the reactor. At the end of a reaction period of 60 minutes, ethanol is injected into the reaction solution to quench the polymerization reaction. The polymer is isolated by coagulation in methanol followed by filtration.

Catalyst activity is determined by mass balance, and the polymer composition is determined by NMR (nuclear magnetic resonance) analysis. Process variables and various properties of the resin product are set forth in the Table.

TABLE

| Example | Catalyst precursor ($\mu$mol) | Promoter/ mmol | Cocatalyst/ mmol | Temp (°C.) | Pressure (psia) | Hydrogen (ml) | 1-Hexene (ml) | Catalyst Activity |
| --- | --- | --- | --- | --- | --- | --- | --- | --- |
| 1 | 20 | PCP/0.80 | DIBAC/0.80 | 85 | 100 | 10 | 20 | 1637 |
| 2 | 21 | PCP/0.84 | DIBAC/0.84 | 85 | 100 | 10 | 20 | 2157 |
| 3 | 22 | PCP/0.88 | DEAC/0.88 | 85 | 160 | 50 | 60 | 2224 |
| 4 | 23 | PCP/0.92 | DEAC/0.92 | 85 | 160 | 50 | 40 | 1833 |
| 5 | 22 | PCP/0.88 | DEAC/0.88 | 85 | 100 | 50 | 20 | 1837 |
| 6 | 24 | PCP/0.96 | DEAC/0.96 | 85 | 100 | 25 | 10 | 1736 |
| 7 | 22 | CHCl$_3$/0.88 | TEAL/0.88 | 85 | 160 | 50 | 60 | 2245 |
| 8 | 44 | CFCl$_3$/1.76 | TEAL/1.76 | 65 | 160 | 15 psi | 20 | 855 |

TABLE-continued

| | | | | | | | | |
|---|---|---|---|---|---|---|---|---|
| 9 | 70 | CFCl₃/2.80 | TEAL/2.80 | 50 | 100 | 10 psi | 250 | 1222 |
| 10 | 23 | PCP/0.92 | TEAL/0.92 | 85 | 160 | 51 | 60 | 1984 |
| 11 | 21 | PCP/0.42 | DEAC/0.84 | 85 | 100 | 10 | 20 | 2291 |
| 12 | 21 | — | DEAC/0.84 | 85 | 100 | 10 | 20 | 699 |
| 13 | 21 | PCP/0.11 | DEAC/0.84 | 85 | 100 | 10 | 20 | 1110 |
| 14 | 22 | PCP/0.22 | DEAC/0.88 | 86 | 100 | 10 | 20 | 1495 |
| 15 | 22 | PCP/0.66 | DEAC/0.88 | 85 | 100 | 10 | 20 | 1854 |
| 16 | 23 | PCP/0.92 | DEAC/0.92 | 65 | 160 | 50 | 60 | 1282 |
| 17 | 23 | PCP/2.30 | DEAC/0.92 | 65 | 160 | 50 | 60 | 3011 |
| 18 | 22 | PCP/0.88 | DEAC/0.88 | 50 | 160 | 50 | 60 | 861 |
| 19 | 22 | PCP/0.88 | DEAC/0.88 | 35 | 160 | 50 | 60 | 242 |
| 20 | 51 | PCP/1.5 | DEAC/1.5 | 35 | 120 | 25 | — | 518 |
| 21 | 25 | PCP/1.5 | DIBAC/1.5 | 65 | 120 | 100 | — | 996 |

| Example | MI (g/10 min) | FI (g/10 min) | MFR | Mw/Mn | density (g/cc) | MP (°C.) | ENB init/total (mmol) | EPDM properties |
|---|---|---|---|---|---|---|---|---|
| 1 | 63 | — | — | — | 0.9050 | 102 | — | — |
| 2 | 6 | 137 | 22 | — | 0.9079 | 102 | — | — |
| 3 | 90 | — | — | — | 0.8682 | 93 | — | — |
| 4 | 110 | 2332 | 21 | — | 0.8892 | 110 | — | — |
| 5 | 226 | 5034 | 22 | 1.7 | 0.8900 | 108 | — | — |
| 6 | 57 | 1140 | 20 | 1.8 | 0.9124 | 113 | — | — |
| 7 | — | 2.2 | — | — | 0.9162 | 119 | — | — |
| 8 | 8.5 | 841 | 99 | — | 0.9573 | 129 | — | — |
| 9 | 3.4 | 649 | 194 | — | 0.9002 | 122 | — | — |
| 10 | 29 | 1776 | 62 | — | 0.8901 | 120 | — | — |
| 11 | 2.3 | 44 | 19 | — | 0.9125 | 106 | — | — |
| 12 | — | — | — | — | 0.9257 | 118 | — | — |
| 13 | 0.45 | 29 | 64 | — | 0.9225 | 110 | — | — |
| 14 | 2.5 | 69 | 27 | — | 0.9117 | 106 | — | — |
| 15 | 107 | 2695 | 25 | — | 0.8942 | 104 | — | — |
| 16 | — | 0.5 | — | — | 0.9286 | 110/118 | — | — |
| 17 | 4.3 | 165 | 39 | — | 0.8945 | 104/116 | — | — |
| 18 | — | — | — | — | 0.9232 | 116/124 | — | — |
| 19 | — | — | — | — | — | 116/126 | — | — |
| 20 | — | 5.8 | — | — | — | — | 3.0/6.0 | see below |
| 21 | — | 25.63 | — | — | — | — | 3.0/5.0 | see below |

Notes to Examples and Table:
1. DEAC=diethylaluminum chloride
DIBAC=diisobutylaluminum chloride
TEAL=triethylaluminum
CHCl₃=chloroform
C2=ethylene
C3=propylene
C6=1-hexene
ENB=ethylidene norbornene
PCP=perchloropropene or perchloropropylene
μmol=micromole
mmol=millimole
EPDM=ethylene/propylene/ethylidene norbornene terpolymer rubber.

3. Catalyst activity=the grams of C2/C6 copolymer or EPDM produced per millimole of vanadium per hour per 100 psi of C2.

4. MI(g/10 min)=melt index is reported in grams per 10 minutes. It is determined under ASTM D-1238, Condition E, at 190° C. and 2.16 kilograms.

5. FI(g/10 rain)=flow index is reported in grams per 10 minutes. It is determined under ASTM-1238, Condition F, at 190° C. and 21.6 kilograms.

6. MFR=melt flow ratio is the ratio of flow index to melt index.

7. EPDM properties:
(i) MOONEY (EST ODR)=Mooney viscosity is estimated using an oscillating disk rheometer (ODR). It is estimated from a linear correlation of gum Mooney viscosity under standard conditions [M(L)(minimum torque resistance) 1+4 at 125° C.] with M(L) measured in ASTM D-3568 formula no. 1 using an ODR at 160° C. and a 1° arc at 100 cpm. The value for example 20 is 69 and for example 21 is 15.

(ii) Cure: M(H) minus M(L)=Formula no. 1 of ASTM D-3568 is used following Procedure 6.1.2 for a miniature internal mixer and Practice D-3182. A Brabender TM mixer with a mixing head maintained at 90° C. is used. Vulcanization characteristics are measured following ASTM D-2084 test methods for the ODR. The cure meter test cavity is maintained at 160° C. The disk is oscillated through a 1° arc rotational amplitude at 100 cpm. The force required to rotate the disk to maximum amplitude is continuously measured. The difference between the maximum torque resistance, M(H), and M(L) is recorded. The value for example 20 is 27.1 and for example 21 is 31.7. Cure values of less than 20 are considered poor; cure values from 20 to 25 are considered satisfactory; and cure values above 25, especially above 30, are considered excellent.

(iii) In example 20, the percent by weight propylene is 26.1% and percent by weight ENB is 5.2%. The weight of EPDM is 33 grams. In example 21, the percent by weight propylene is 22.4% and percent by weight ENB is 9.1%. The weight of EPDM is 31 grams.

8. Examples 7 to 10 can be compared with examples 1 to 6 and 11, which are representative of the invention. The products of examples 7 to 10 are heterogeneous resins characterized by high melt flow ratios and high melting points even though the resin densities are relatively low. The products of examples 1 to 6 and 11, on the other hand, are homogeneous resins characterized by low melt flow ratios and low melting points, which indicate narrow molecular weight distribution and narrow comonomer distribution.

We claim:

1. A catalyst system comprising:
   (A) a catalyst precursor comprising:
   (i) a vanadium compound, which is the reaction product of
      (a) $VX_3$ wherein each X is independently chlorine, bromine, or iodine; and
      (b) an electron donor, which is a liquid, organic Lewis base in which $VX_3$ is soluble;
   (ii) a modifier having the formula $BX_3$ or $AlR_{(3-a)}X_a$ wherein each R is independently alkyl having 1 to 14 carbon atoms; each X is as defined above; and a is 0, 1, or 2 and the molar ratio of modifier to vanadium is in the range of about 1:1 to about 10:1; and
   (iii) a support for said vanadium compound and modifier,
   (B) a cocatalyst consisting of a compound having the formula $AlR_{(3-a)}X_a$ wherein R and X are as defined above and a is 1 or 2 and the molar ratio of cocatalyst to vanadium is in the range of about 10:1 to about 500:1; and
   (C) a promoter consisting of a saturated or an unsaturated aliphatic halocarbon having at least 3 carbon atoms and at least 6 halogen atoms, or a haloalkyl substituted aromatic hydrocarbon wherein the haloalkyl substituent has at least 3 halogen atoms and the molar ratio of promoter to cocatalyst is in the range of about 0.01 to about 10:1.

2. A catalyst system comprising:
   (A) a catalyst precursor comprising:
   (i) a vanadium compound, which is the reaction product of $VCl_3$ and tetrahydrofuran;
   (ii) a modifier, which is diethylaluminum chloride or ethylaluminum sesquichloride, wherein the molar ratio of modifier to vanadium is in the range of about 2:1 to about 5:1; and
   (iii) a silica support for said vanadium compound and modifier,
   (B) as a cocatalyst, diethylaluminum chloride or diisobutylaluminum chloride, wherein the molar ratio of cocatalyst to vanadium is in the range of about 30:1 to about 150:1; and
   (C) as a promoter, perchloropropene, wherein the molar ratio of promoter to cocatalyst is in the range of about 0.2:1 to about 1:1.

3. The catalyst system defined in claim 1 wherein the catalyst precursor is in a prepolymerized state.

4. The catalyst system defined in claim 2 wherein the catalyst precursor is in a prepolymerized state.

* * * * *